United States Patent [19]
Summerfield

[11] 3,784,211
[45] Jan. 8, 1974

[54] PHONOGRAPH FOR PLAYING STATIONARY RECORD

[75] Inventor: William F. Summerfield, Huntington Beach, Calif.

[73] Assignee: Mattel, Inc., Hawthorne, Calif.

[22] Filed: May 30, 1972

[21] Appl. No.: 257,508

[52] U.S. Cl. .................................... 274/9 R, 353/19
[51] Int. Cl. ............................................ G11b 17/06
[58] Field of Search .................. 274/9, 23, 9 R, 9 A, 274/9 B; 353/15–19

[56] References Cited

UNITED STATES PATENTS

| | | | |
|---|---|---|---|
| 3,484,111 | 12/1969 | Staar | 274/9 C |
| 3,240,117 | 3/1966 | Wickstrom | 353/19 |
| 3,667,763 | 6/1972 | Summerfield | 274/23 R |
| 3,480,356 | 11/1969 | Dimitracopoulas | 353/19 |
| 3,193,295 | 7/1965 | Isemura | 274/9 D |

*Primary Examiner*—Louis R. Prince
*Assistant Examiner*—A. J. Mirabito
*Attorney*—Max E. Shirk and Franklin D. Jankosky

[57] ABSTRACT

A phonograph which plays a selected one of several spiral grooves on a stationary record, including a drive shaft with a high helix angle thread which engages a tone arm carrier, so that when the drive shaft begins rotating, the carrier is urged to rotate and is also urged to move axially down towards the record. A stop on the phonograph housing prevents rotation of the carrier past the stop until the carrier has moved sufficiently towards the record for a tone arm on the carrier to engage a record groove, the carrier then lying below the stop so it can be rotated. The record has a peripheral portion containing pictures that can be viewed, a hub portion containing several spiral record grooves, and a resilient portion connecting the hub to the peripheral portion to allow up and down movement of the hub.

5 Claims, 4 Drawing Figures

PHONOGRAPH FOR PLAYING STATIONARY RECORD

BACKGROUND OF THE INVENTION

Phonographs which can play stationary records are useful in many situations, including those where the record also contains pictures that can be viewed while the record is being played. Where the record has many interleaved spiral grooves, and it is desired to enable selection of a particular one of the grooves to be played each time, then a mechanism is required that can bring the tone arm onto the record at a particular rotational position of the tone arm. Whie complicated mechanisms can be devised for moving the tone arm against and away from the record and for controlling the position at which the tone arm engages the record, such mechanisms can greatly increase the cost of the phonograph and decrease its reliability. In order for the phonographs to be produced at low cost, it is desirable to provide a mechanism which is as simple as possible that can perform the required functions.

SUMMARY OF THE INVENTION

In accordance with one embodiment of the invention, a simple toy phonograph is provided which can play a stationary record, the phonograph being constructed to play a selected one of several spiral record grooves whose lead-in portions are circumferentially spaced on the record. The phonograph includes a drive shaft with a helical spline and a tone arm carrier which engages the spline so that the carrier can be rotated by the shaft and can also slide axially toward and away from a record. A stop on the phonograph housing prevents rotation of the carrier past a predetermine position until the carrier has slid to a position where the tone arm engages the record. The stop therefore determines the position at which the tone arm engages the record to thereby select the record groove which will be played.

The toy phonograph includes a viewer, and the record has a peripheral portion around the groove-containing hub portion, the peripheral portion holding transparencies to be viewed as the grooves are being played. The grooved hub portion of the record is held to the peripheral picture-holding portion by a corrugated region which permits the hub portion to move up and down. This permits the tub portion to be deflected downwardly by the tone arm so that the tone arm can be moved to a position free of the stop while engaging the record. The resilient connection also permits the tub portion to vibrate, so that the hub portion serves as a speaker cone to mechanically amplify vibrations.

The novel features of the invention are set forth with particularity in the appended claims. The invention will best be understood from the following description when read in conjunction with the accompanying drawings.

DESCRIPTION OF THE PREFERRED EMBODIMENT

Figures 1, 4:
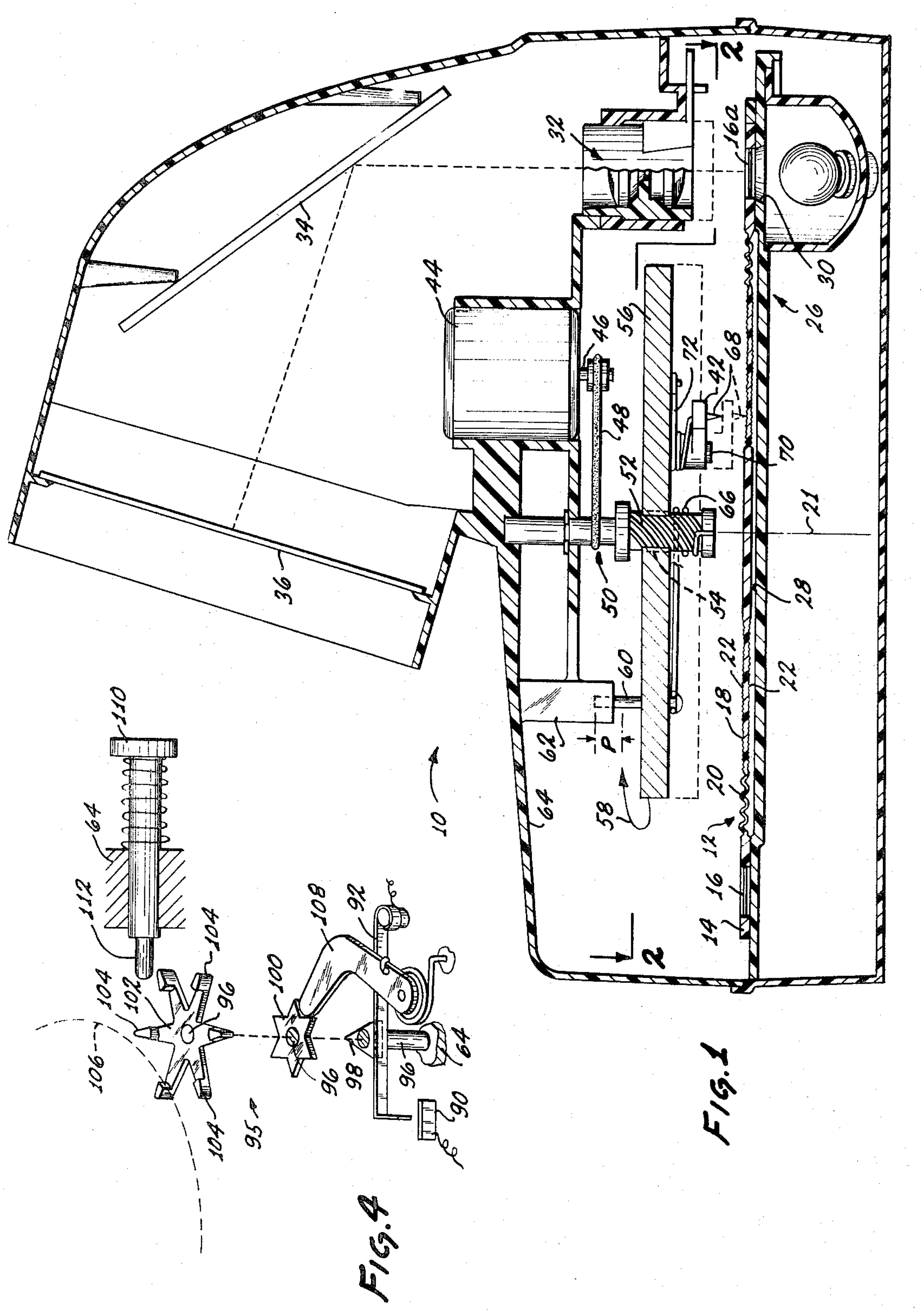
FIG. 1 is a sectional side view of a phonograph constructed in accordance with the invention.
FIG. 4 is a partial perspective view of the stop-start mechanism of FIG. 3.

As shown in the figures, a combination toy phonograph and viewer device 10 is provided for playing and viewing a record 12. The record has a peripheral portion 14 containing a plurality of transparency pictures 16 for viewing, and a hub portion 18 containing a plurality of spiral record grooves on each face thereof. A resilient connecting portion 20 connects the peripheral and hub portions 14, 18 to enable the hub portion 18 to move axially with respect to the peripheral portion, that is, to enable movement along an imaginary axis 21 extending through the center of the disc and normal to its faces. The transparencies 16 are circumferentially spaced about the record. The record grooves 22 are of spiral form and are interleaved, and they have lead-in portions 24 which are also circumferentially spaced about the record.

Figure 2:
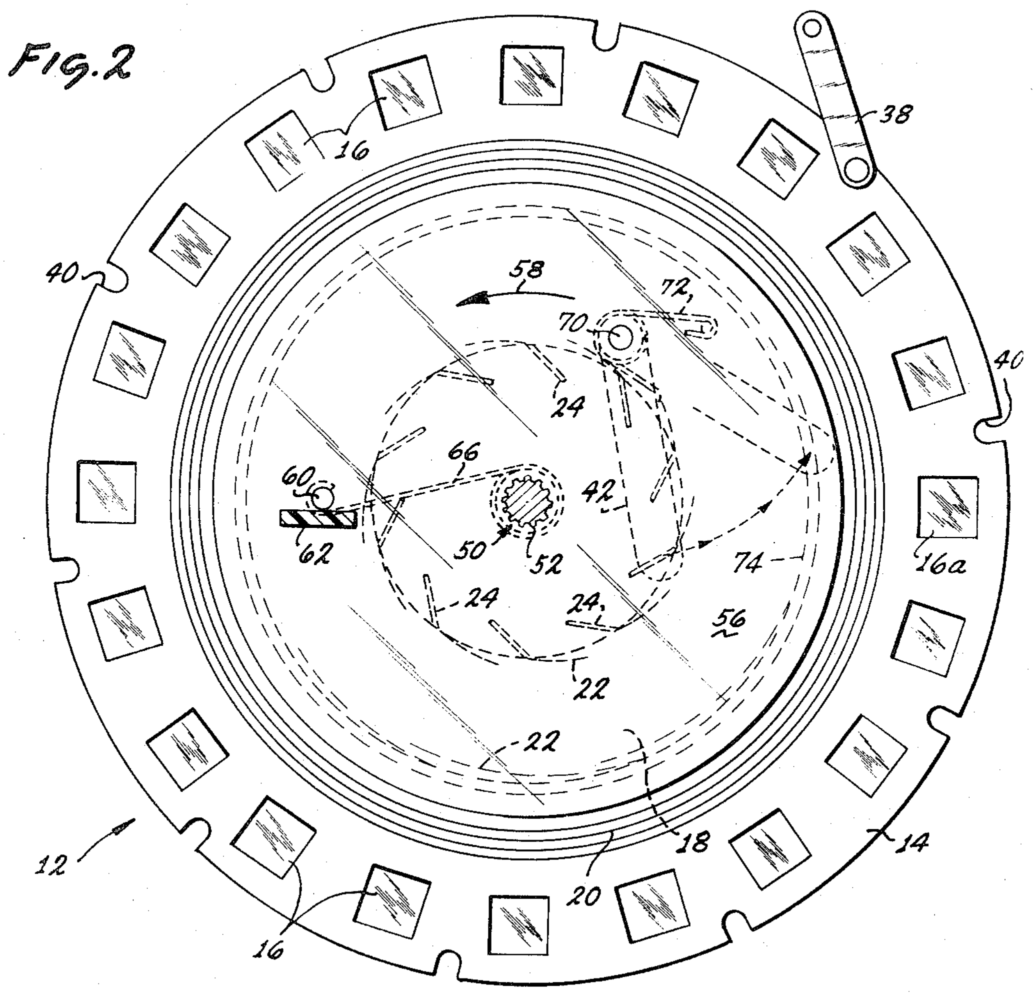
FIG. 2 is a partial view taken on the line 2—2 of FIG. 1.

The record 12 can be installed in the housing 10 and held on a record supporting portion 26. The supporting portion 26 supports only the peripheral portion 14 of the record, there being a recess 28 below the grooved hub portion 18. The record supporting portion 26 forms a window 30 that can be aligned with one of the transparencies 16 to shine light through the transparency, so that the light is directed through a lens 32, reflected by a mirror 34, and imaged on a viewing screen 36. The record 12 can be turned to different positions so that different transparencies 16 are viewed. An indexing member 38 (FIG. 2) is received in a notch 40 of the record to hold it at a position where a particular picture **16*a* is aligned with the window 30 in the record supporting portion. The indexing member can be manually pivoted out of a notch to permit the record 12 to be turned to a new position. The record grooves 22 have recordings corresponding to the different pictures, and it is desirable that a particular groove be played each time whose recording corresponds to the particular picture 16a** which is being viewed, for any position of the record in the housing.

The record 12 cannot be allowed to rotate during the playing of a record groove, since the picture **16*a* which is being viewed should be stationary. Accordingly, a playing mechanism is provided wherein the tone arm 42 rotates about the record. The playing mechanism includes a motor 44 whose output shaft 46 is connected by a drive belt 48 to a driving member of shaft 50. The shaft has helical splines 52 which form a thread with a large helix angle, engaged with a corresponding thread 54 on a carrier 56. When the motor drives the shaft 50 in the direction indicated by arrow 58, it also tends to rotate the carrier 56 and the tone arm 42 thereon. However, if the carrier is prevented from rotating, then it will move down along the helix 52 towards the record 12. In order to cause such axial movement of the carrier 56, a pin 60 is mounted on the carrier at a location at which it can engage a stop 62 that is mounted on the housing 64 of the phonograph. When the carrier 56 is in its upward position, as indicated in solid lines in FIG. 1, the pin 60 will engage the stop 62, which prevents rotation of the carrier with the drive shaft 50. If the drive shaft 50 continues to turn in the direction of arrow 58, then the carrier will move along the helix 52 towards the record 12 until the pin 60 reaches a position where it is below the stop. The carrier 56 then can be rotated by the drive shaft 50 to rotate the tone arm 42** around the record and play it.

The carrier initially starts at the position shown in solid lines in FIG. 1 where it holds the tone arm 42 away from the record. When the motor 44 is energized, it immediately begins rotating the drive shaft 50. The carrier 56 may then begin rotating, but it will be stopped after less than one complete turn, when the pin 60 engages the stop 62. The carrier 56 then moves down along the helix 52 on the drive shaft until the pin 60 is disengaged from the stop. During such movement, a light spring 66 is compressed. As the carrier 56 moves along, the tone arm 42 moves down towards the record until the stylus 68 of the tone arm engages the hub portion 18 of the record where the grooves are located. As the carrier continues rotating, the tone arm 42 continues rotating around the record, remaining engaged in the record groove which it first entered. The tone arm 42 engages the record at a predetermined rotational position which is the position of the tone arm at which the pin engages the stop 62. The stylus of the tone arm will enter the first lead-in groove portion it encounters as the tone arm begins rotating after the pin 60 disengages from the stop 62.

During the start of record play, it is desirable that the stylus 68 engage the record just prior to the pin 60 moving under the stop 62. The tone arm 42 is loosely held on a post 70 of the carrier, and a spring 72 urges the stylus end of the tone arm down towards the record. When the stylus first engages the record while the pin 60 is still engaged with the stop 62, the carrier can continue moving down the small amount necessary for the pin to clear the stop, even though the stylus is prevented by the record from moving down as much, since the tone arm can move up with respect to the carrier. In addition, the resilient connecting portion 20 of the record permits the hub portion 18 of the record to be deflected downwardly a small amount by the tone arm. As the stylus 68 of the tone arm moves along the record, the record supplies considerable frictional drag. This drag, or resistance to rotation of the carrier 56 keeps the carrier at the lower end of the helix 52 on the drive member so that the pin 60 remains below the stop 62. Between the initial and final positions of the carrier, the pin moves down a distance P.

During the playing of the record, the stylus 68 follows along a spiral record groove from the radially inner region where the lead-in portions of the grooves are located to the radially outer region where a runout groove 74 is located. When the tone arm reaches the runout groove it trips a shut-off mechanism which de-energizes the motor 44. The drive shaft 50 then no longer drives the carrier 56, so that the stylus no longer moves along the runout groove. As a result, there is no frictional drag supplied to the carrier 56 and it can be moved upwardly by the spring 66. The tone arm 42 is therefore lifted off the record. The spring 72 then serves to pivot the tone arm about the post 70 in a radially inward direction where the stylus 68 of the tone arm lies over the record region containing the lead-in groove portions 24.

The record grooves 22 are modulated in depth so that they tend to cause the stylus 68 to vibrate up and down. It would be possible to provide a speaker cone on the carrier 56 to amplify such vibrations. However, in this embodiment of the invention the record 12 is constructed so that the hub portion 18 which contains the grooves acts as an amplifying speaker cone. The resilient connecting portion 20 which connects the hub portion 18 of the record to the peripheral portion 14 allows the hub portion 18 to vibrate up and down. Since the hub portion lies over a recess 28, it is able to vibrate and therefore mechanically amplify sounds. The amplitude of vibrations of the hub portion 18 depends upon the relative masses of the hub portion 18 and the tone arm 42. If the hub portion is constructed of thin lightweight plastic and the tone arm 72 is constructed so that it has considerable mass, as by forming it of steel, then the record portion 18 can be made to vibrate appreciably. Vibrations of the hub portion 18 of the record can be allowed to escape above or below it, and holes can be formed in the housing under the hub portion 18 to minimize muffling of the sound.

Figure 3:
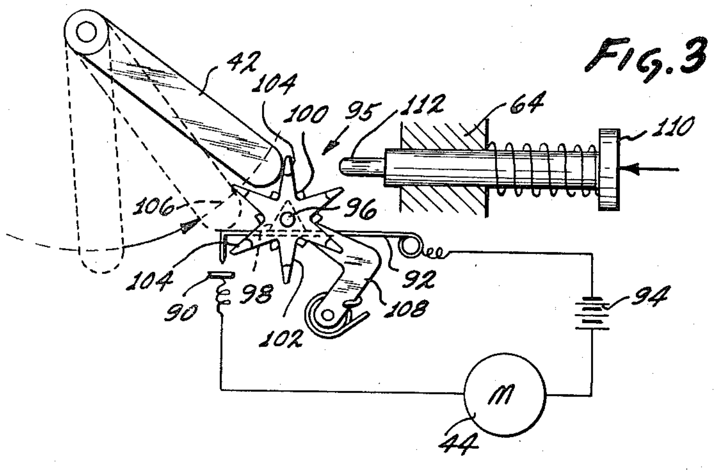
FIG. 3 is a partial plan view of the stop-start mechanism of the phonograph of FIG. 1.

The phonograph can be provided with a variety of devices for energizing and de-energizing the motor 44. A battery can be held in the phonograph housing and connected to the motor merely by a manually operated switch. This would require that a child not only turn the switch on to begin playing of the record, but that he also turn off the switch after the record has been played and the stylus is moving along the runout groove of the record. FIGS. 3 and 4 illustrate an automatic turn-off mechanism which can be used to de-energize the motor. The mechanism includes a pair of switch contacts 90, 92 which connect an electric cell 94 to the motor 44. The switch contacts can be opened and closed on each other by a cam assembly 95 which includes a shaft 96 rotatably mounted on the housing 64. The cam assembly includes a triangular cam 98 which can move one of the resilient contacts 92 against and away from the other contact 90, a detent cam 100, and an operated cam 102 being fixed to the shaft 96. The operated cam 102 has six fingers 104, one of which is located in the path 106 of the outer end of the tone arm when the tone arm stylus is moving along the runout groove portion 74 of the record. When the tone arm passes the operated cam 102, it moves one of the arms 104 so that the cam 102 is rotated by approximately 1/6 of a turn. If the triangular cam 98 was previously holding the switch contact 92 against the outer contact 90 then a 1/6 turn will cause the cam 98 to release the contact 92 so that the switch is opened and the motor is de-energized. The detent cam 100 has six concave sides and is engaged by a detent lever 108 that moves the detent cam to one of six rotational positions so that the cam assembly is held at one of these positions. After the motor has been stopped, a child can start it again by depressing a start button 110 that is slideably mounted on the housing. The button 110 has an inner end 112 which engages one of the fingers 104 to pivot the operated cam 102 by slightly more than 1/12 of a turn. After the button 110 is released, the detent lever 108 will move the detent cam 100 the rest of the 1/6 turn. Such a 1/6 turn causes a point of the triangular cam 98 to push against the contact 92 to close the switch and re-energize the motor. Of course, this is just one example of an automatic turn-off mechanism, and a variety of mechanisms can be employed.

Thus, the invention provides a simple mechanism for playing a stationary record. The playing mechanism includes a tone arm carrier threadably engaged with a motor driven member, the thread or spline having a helix so that the carrier slides axially when it is prevented from rotating with the drive member. The helix angle is preferably high enough so that at the end of play, the carrier will rotate and move axially along the drive member when pushed in an axial direction by a spring. A stop positioned on the housing of the phonograph prevents rotation of the carrier at a predetermined position, so that the carrier moves axially to cause the tone arm to engage the record at a predetermined position of the tone arm about the record. The tone arm means does not have to include a pivotally mounted member, but may be any part which includes a stylus that can play a record. A record can be utilized which has a groove-containing portion which is resiliently supported with respect to a peripheral portion, so that the grooved portion can be deflected axially to help allow the carrier to remain disengaged from the stop. In addition, the resilient connection of the groove-containing portion to the periphery portion of the record enables the grooved portion to vibrate so that it acts like a speaker cone to mechanically amplify vibrations.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A toy phonograph for playing a record comprising:
a housing having record supporting means;
a drive member rotatably mounted on said housing;
a motor coupled to said drive member to rotate it;
a carrier threadably mounted on said drive member for relative rotation on the threads thereof to produce axial sliding of said carrier toward and away from said record supporting means upon such relative rotation;
tone arm means on said carrier for playing a record on said record supporting means when said carrier is slid along said drive member towards said record supporting means, whereby relative rotation of the carrier to the drive member causes the tone arm means to move against and away from the record; and
stop means on said housing, engageable with said carrier when said tone arm means is spaced above a record on said supporting means whereby to hold said carrier against rotation and cause said drive member to drive said carrier downwardly toward said supporting means.

2. The toy phonograph described in claim 1 wherein:
said tone arm means includes a stylus-holding member movable in an axial direction on said carrier and spring biased toward said record supporting means.

3. The toy phonograph described in claim 1 including:
a record with at least one groove, said record disposed on said record supporting means, with at least the portion containing the groove being resiliently movable toward and away from the drive member.

4. A toy phonograph comprising:
record holding means;
a carrier mounted for rotation and for axial movement toward and away from said record holding means;
rotary driving means for said carrier;
tone arm means mounted on said carrier for playing a record;
cooperating means on said driving means and carrier for urging said carrier to rotate and for urging said carrier toward said record holding means in respond to any imposed resistance to rotation of said carrier;
stop means at a predetermined position about the axis of rotation of the carrier; and
stop engaging means mounted on said carrier at a position to engage said stop and prevent carrier rotation until the carrier moves past a predetermined position toward said record holding means to engage said tone arm means with a record and thereby impose frictional resistance to rotation of said carrier.

5. The toy phonograph described in claim 4 wherein:
said record holding means has a peripheral supporting region and a depression therewithin; and including
a record having a peripheral portion removably held on said supporting region, a second portion containing a record groove and lying within said peripheral portion, and a resilient ring-shaped portion joining said peripheral and second portions to permit said second portion to deflect away from and toward said carrier.

* * * * *